(12) United States Patent
Hill (10) Patent No.: US 10,525,483 B1
(45) Date of Patent: Jan. 7, 2020

(54) DISSOLVED AIR FLOTATION SKIMMINGS SEPARATION SYSTEM AND METHOD

(71) Applicant: Riles Edward Hill, Dahlonega, GA (US)

(72) Inventor: Riles Edward Hill, Dahlonega, GA (US)

(*) Notice: Subject to any disclaimer, the term of this patent is extended or adjusted under 35 U.S.C. 154(b) by 14 days.

(21) Appl. No.: 16/021,896

(22) Filed: Jun. 28, 2018

Related U.S. Application Data (60) Provisional application No. 62/527,904, filed on Jun. 30, 2017.

(51) Int. Cl.
| | |
|---|---|
| *F26B 7/00* | (2006.01) |
| *B03D 1/14* | (2006.01) |
| *B03D 1/02* | (2006.01) |
| *C02F 1/40* | (2006.01) |
| *B02C 19/00* | (2006.01) |
| *B01D 21/00* | (2006.01) |
| *C02F 1/24* | (2006.01) |
| *C02F 11/18* | (2006.01) |
| *F26B 3/06* | (2006.01) |

(52) U.S. Cl.
CPC ........ *B03D 1/1431* (2013.01); *B02C 19/0043* (2013.01); *B03D 1/028* (2013.01); *B03D 1/1468* (2013.01); *C02F 1/40* (2013.01); *F26B 7/00* (2013.01); *B01D 21/009* (2013.01); *C02F 1/24* (2013.01); *C02F 11/18* (2013.01); *F26B 3/06* (2013.01)

(58) Field of Classification Search
CPC .... B03D 1/1431; B03D 1/028; B03D 1/1468; C02F 1/24; C02F 1/40; C02F 11/18; B02C 19/0043; B01D 21/009; F26B 7/00; F26B 3/06

USPC ....... 210/703, 221.2; 34/424, 435, 507, 586, 34/593, 599

See application file for complete search history.

(56) References Cited

U.S. PATENT DOCUMENTS

| | | | |
|---|---|---|---|
| 5,570,517 A | 11/1996 | Luker | |
| 5,759,568 A * | 6/1998 | Mosley, Sr. ............... | C02F 1/24 424/439 |

(Continued)

OTHER PUBLICATIONS

Scott Equipment Company, AST Dryer, www.scottequipment.com/ast-flash-dryer-system.html; 7 pages; (2016); Scott Equipment Company, 605 4th Avenue Northwest, New Prague, Minnesota 56071.

(Continued)

*Primary Examiner* — Thomas M Lithgow
(74) *Attorney, Agent, or Firm* — Baker Donelson; Carl M Davis, II; Dorian B Kennedy (57) ABSTRACT

A DAF skimmings separation system 10 that processes SPN/DAF skimmings 11 received from a meat processing facility to separate water and SPN-content solids includes a heating chamber coupled to a processor chamber having one or more pressurized discharge nozzles that expels DAF skimmings onto a spatter plate to cause SPN animal components within the DAF skimmings to break into smaller pieces denaturing the molecular structure and allowing the entrapped moisture to be evaporated within a heated airstream in the processing chamber, for separating nutritionally valuable SPN while reducing moisture content. A method of processing DAF skimmings to yield dryer SPN with reduced moisture content is disclosed.

27 Claims, 6 Drawing Sheets

(56) References Cited

U.S. PATENT DOCUMENTS 8,163,176 B2     4/2012   Hill
9,174,220 B2     11/2015   Lucas
2016/0272526 A1     9/2016   Hill

OTHER PUBLICATIONS

Scott Equipment Company, AST Dryer System, www.scottequipment. com/ast-flash-dryer-system.html; 3 pages; (undated but see item 3, at least Jul. 24, 2017); Scott Equipment Company, 605 4th Avenue Northwest, New Prague, Minnesota 56071.

Scott Equipment Company, AST Dryer System, www.web.archive. org/web/20170724202538/http://www.scottequipment.com:80/ast-flash-dryer-system.html; 7 pages; (Jul. 24, 2017); Scott Equipment Company, 605 4th Avenue Northwest, New Prague, Minnesota 56071.

\* cited by examiner

DISSOLVED AIR FLOTATION SKIMMINGS SEPARATION SYSTEM AND METHOD

The present application claims benefit of U.S. Provisional patent application Ser. No. 62/527,904, filed Jun. 30, 2017, incorporated herein by reference in its entirety.

TECHNICAL FIELD

The present invention relates to the field of dissolved air floatation (DAF) skimmings separation that recovers by-product nutrients while minimizing waste residuals for disposal and returning clarified water to sanitary water supply systems for processing and discharge. More particularly, the present invention relates to heated air dryer-based separation and dewatering of DAF skimmings separation systems and a method of operating such.

BACKGROUND OF THE INVENTION

The meat industry, including the poultry processing industry, faced challenges with cost effective handling of sludge (typically referred to as dissolved air floatation (DAF) skimmings) that results from processing. DAF skimmings originates as the watery waste from meat processing and from cleaning of the process facilities. By volume, DAF skimmings is primarily water, but DAF skimmings also contain waste such as bone chips, skin parts, animal by-products, and scraps, of which some is valuable animal fat, protein and other nutrients. Efforts are made to extract at least some of the water from the DAF skimmings, such as by drainage from holding tanks, for subsequent transfer of the at-least partially dewatered DAF skimmings to rendering plants. Dewatering reduces the volume of DAF skimmings that is to be transported by truck and thus lowers the cost of handling processing plant waste. Further, water supply systems often require processing plants to filter and clean the waste water before return to sanitary sewer systems.

The rendering process further dewaters and dries the DAF skimmings and separates fats from valuable bone, protein and nutrients, which are referred to as Secondary Product Nutrients (SPN) that can be sold to mill manufacturers of livestock and aquiculture feed for further beneficial uses and products. However, free fatty acids develop quickly and build-up in the DAF skimmings. As the DAF skimmings deteriorates, free fatty acids build up, and as the free fatty acids increase, the valuable animal fat and protein nutrients decrease and become rancid. High concentrations of free fatty acids prevent further processing and use of the valuable SPN. The SPN all too often wind up in landfills and essentially a profitable by-product for the meat processing industry is thrown away.

There are difficulties with DAF skimmings processing whether for return of water to sanitary sewer systems or for further use of SPN after rendering of the processing wastes. SPN within DAF skimmings is solid sensitive such that it is difficult to break apart properly and de-water. Belt press devices and gravity dewatering process have been developed but there are drawbacks. Primarily, the end result was typically a product that was a prime target for pathogens and free fatty acid growth. This defective product was waste and lacked value but also resulted in unpleasant plant odor. Often DAF skimmings was transferred to landfill without recovery of the lucrative animal by-products.

When SPN is formed, the bonds between the fat, water and solids are generated by chemical polymers and coagulation agents. This allows the removal of fat and solids from wastewater. While most of these compounds may be mechanically separated, a portion of the SPN however is bound tightly by the chemical compounds that combined with an energy source (such as steam injection) that an emulsion is formed. Heretofore, separation of the emulsions into individual parts is accomplished by heat process and by chemical process, and each has unsatisfactory drawbacks.

The heat process applies high heat (above 265 degrees F.) to the emulsions to evaporate a large portion of the water from the compound. The fat and solids can then be separated mechanically. Remaining water is removed, after the mechanical separation is complete, by applying heat again to the individual components for evaporation of the remaining water.

The chemical process introduces a solvent (for example, hexane) to the emulsion. The solvent removes the electrical charge of the compound that is binding the fat, solids and water and allows for mechanical separation.

While these processes accomplish the recovery of the valuable fats, and portions of the water evaporate rather than discharge into sanitary and water treatment systems, and the separated solids reduce the volume for landfill or other uses, the processes have high energy and high chemical costs. Absent recoverability equipment for accomplishing reuse, the cost for chemical separation may be prohibitive. Also, most of the chemical solvents are hazardous air pollutants and require close monitoring and control to prevent improper release.

My earlier U.S. Pat. No. 8,163,176 discloses an apparatus and method for cracking the DAF skimmings to break apart the fat, protein and solids from the waste and water. The fat and solids float to the top surface of the water and problematic pathogens and bacteria evaporate. The water drains from the stratified DAF skimmings, and the resulting decanted solids contain the profitable SPN with animal fat, protein and other nutrients and beneficially, with reduced water content, have a significantly reduced volume for transport. The decanted water may be cleaned appropriately for return to sanitary sewer systems. The decanted solids have high quality SPN content, reduced free fatty acid growth, and decreased odor.

The disclosed apparatus for cracking DAF skimmings, while successful in reducing water content, nevertheless does not provide for the optimal separation of water from the SPN within water waste DAF skimmings for large commercially significant meat processing facilities. Accordingly there is a need in the art for an improved apparatus and method for separation of the fats, solids and water while reducing energy and chemical costs. It is to such that the present invention is directed.

SUMMARY OF THE INVENTION

The present invention meets the need in the art by providing a DAF skimmings separator system for separating SPN animal component solids from water within a supply of DAF skimmings, comprising an exhaust fan for creating an airstream, a heating chamber having a heat source to provide a heat to the airstream, a processor chamber in fluid communication with the heating chamber, the processor chamber having an animal component solids outlet and an airstream outlet, and a liquid pressurizing pump coupled to a DAF skimmings input conduit terminating at an introductory pressure nozzle positioned within the processor chamber. The liquid pressuring pump is adapted to pressurize a supply of DAF skimmings expelled through the introductory pressure nozzle and direct the DAF skimmings onto a spatter surface positioned within the processor chamber adjacent the introductory pressure nozzle so that the pressurized DAF skimmings ejected from the introductory pressure nozzle impacts upon the spatter surface with sufficient force to cause animal components within the DAF skimmings to break into smaller pieces. The DAF skimmings separator system also has a first animal component solids collector in fluid communication with the processor chamber animal component solids outlet, a separator in fluid communication with the processor chamber airstream outlet to separate animal component solids from the airstream passing through the separator, the separator has an air outlet and an animal component material outlet, and a second animal component solids collector in fluid communication with the animal components material outlet.

In another aspect, the invention provides a method of separating animal component solids from water within a supply of DAF skimmings. The method comprises the steps of providing a DAF skimmings separator system having a heated airflow creating system, a processor chamber, a liquid pressurizing system having an introductory pressure nozzle positioned within the processor chamber for pressuring and ejecting a supply of DAF skimmings containing animal components and water, and a spatter surface positioned within the processor chamber adjacent the introductory pressure nozzle. The supply of DAF skimmings is pressurized and ejected through the introductory pressure nozzle so as to impact upon the spatter surface positioned within the processor chamber with a force sufficient to break the animal components within the DAF skimmings into smaller pieces. The animal components impacted upon the spatter surface are entrained into an airstream created by the heated airflow creating system where they are conveyed from the processor chamber. A second portion of the animal components within the processor chamber which were not entrained into the airstream are then collected via gravity fall out to a catch basin.

Other objects, advantages, and features of the present invention are readily apparent upon a reading of the following detailed description together with reference to the drawings and the appended claims.

BRIEF DESCRIPTION OF THE DRAWINGS

FIG. 4 illustrates in schematic view the DAF skimmings separation apparatus in accordance with the present invention in a second embodiment.

FIG. 5 illustrates in schematic view details of a portion of the DAF skimmings separation apparatus shown in FIG. 4.

FIGS. 6A, 6B, and 6C illustrate in schematic end view of a respective portion of the DAF skimmings separation apparatus shown in FIG. 4.

DETAILED DESCRIPTION

With reference to the drawings in which like parts have like reference numerals, FIG. 1 illustrates in schematic view a first embodiment of a DAF skimmings separation system 10 in accordance with the present invention. The DAF skimmings separation system 10 processes SPN 11 received from a meat facility processing within DAF skimmings so as to separate water and SPN-content solids as disclosed herein. The water decants into a drain for water treatment and clarifying prior to being discharged to a sanitary sewer system. The SPN-content solids discharge is transported to rendering plants for conventional processing to extract the SPN for use in other products.

The DAF skimmings separation system 10 includes a heating chamber 13 having an air inlet 14 and an air outlet 15. The heating chamber 13 may have a gas fired burner which is direct or indirectly fired to provide an efficient heat source. The heating chamber 13 may include one or more blowers 17 and internal burners (unshown) that heats an airstream passing there through to a temperature of approximately 400 to 550 degrees Fahrenheit. The heating chamber 13 may be remote from the DAF skimming separation system 10, or proximate beside the system 10, for dryer processing and separation of DAF skimmings with the system 10.

The heated air from the heating chamber 13 is passed to a processor or processor chamber 20 through a first duct 21 connected at one end to the heating chamber air outlet 15 and an opposite end connected to an air inlet 25 of the processor chamber 20, as indicated by the directional airflow or airstream 26 shown in phantom lines in the drawings. The processor chamber 20 includes (unshown in the present embodiment but shown in the second embodiment of FIG. 4), internal, rotary driven beater blades which induce a mixing motion to the airstream 26 as the airstream passes through the processor chamber 20. The beater blades are driven by a shaft coupled to an electric motor 27 via belts and sheaves for mechanical rotation of the shaft and beater blades. The processor chamber 20 also has an air outlet 29 coupled to a second duct 31 which conveys the airstream 26 to the air inlet 33 of a separator chamber, vessel, or cyclone separator 34. Lastly, the processor chamber 20 has a solids outlet or material discharge 35 which is in fluid communication with a solids collection bin 36 and centrifuge fats separator 37. The fats separator 37 has a fats outlet connected to a fat catch tank 38 and a solids outlet connected or positioned for material acceptance to a conveyor 39. A delivery pipe 56 and pump 57 connects the fat catch tank 38 to a larger fat holding tank 58.

The processor 20 includes a product feed or material input conduit or line 41 having a terminal end, introductory pressure nozzle, or introductory discharge nozzle 42 closely adjacent the air inlet 25 of the processor 20. The material input line 41 includes a pressure pump 43 which pressurizes the slurry to approximately 300 p.s.i., however, it should be understood that a preferable range of pressures may be between 100 to 600 p.s.i. depending upon select product and system parameters. The discharge nozzle 42 may be between ¼ inch to one inch in diameter.

The discharge nozzle 42 is oriented to direct the pressurized stream of slurry expelled from the discharge nozzle 42 onto a spatter plate 44 positioned adjacent the entry end of processor 20 and spaced away from the interior of the processor 20 to create a space 46 at least partially about the spatter plate. The discharge nozzle 42 is positioned approximately 5 to 6 inches from the spatter surface 45. The spatter plate 44 has a spatter surface 45 oriented at an oblique angle relative to the direction of the SPN-containing DAF skimmings stream expelled from the discharge nozzle 42, and preferably at an angle of approximately 30 to 45 degrees with respect to the direction of the DAF skimmings stream, shown in FIG. 2 as angle a. The spatter surface 45 is approximately 4 to 12 inches in diameter and is made of a hardened metal such as abrasion resistant steel plate or comparable material to prevent erosion upon the spatter surface 45.

The separator cyclone 34 has an air outlet 47 located adjacent the top end of the separator cyclone and a solids or material outlet 48 located at the bottom end of the separator cyclone. In at least one embodiment, the material outlet 48 may be coupled to a control or feeder valve 50 which in turn is coupled to a down pipe 51. The down pipe 51 may convey the solid material to the solids conveyor 39, or other type of delivery system, which terminates at a solids holding bin 54.

The air outlet 47 of the separator cyclone 34 is connected to a first end of a third duct 59 having an opposite, second end connected to the air inlet 14 of the heating chamber 13. The third duct 59 may include an air filtration system 60 and an exhaust fan 61 to provide or supplement the airstream 26 through the system 10. The third duct 59 may include an airstream equalizing valve 62 which may vent a portion of the airstream 26 to ambience to prevent over pressurization of the system.

The basic design of the heating chamber 13, processor chamber 20, separator 34, and other components are conventional and well known in the art. These portions or components are shown in U.S. Pat. No. 9,174,220 B2 which is specifically incorporated herein by reference in its entirety.

In use, the initial DAF skimmings 11, comprised of approximately 85 to 90% by weight of water with the remaining portion consisting of SPN animal components, such as fat, blood, bodily fluids, bone fragments, etc., is pressurized to approximately 300 p.s.i. by pressure pump 43. The pressurized DAF skimmings 11 is then conveyed through material input line 41 and expelled from the discharge nozzle 42 as a forceful stream of DAF skimmings having a pressure of approximately 300 p.s.i. and a velocity of approximately 1.2 cfm or 9 gpm.

Figure 2:
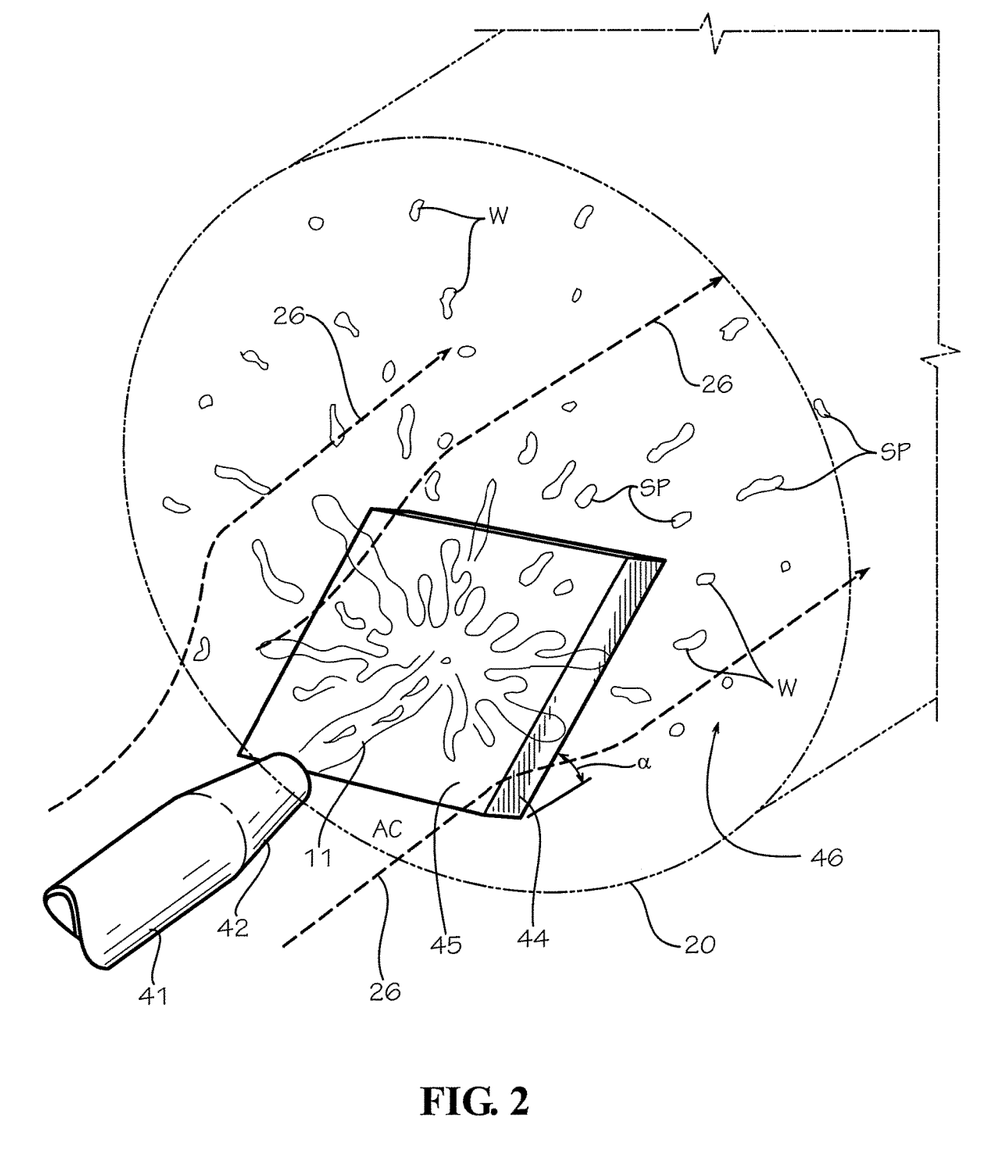
FIG. 2 illustrates a perspective view of a portion of the DAF skimmings separation apparatus shown in FIG. 1.

As best illustrated in FIG. 2, the expelled stream of DAF skimmings 11 is in-line with the spatter plate 44 so that the DAF skimmings stream impacts, splatters, or spatters upon the spatter surface 45 of the spatter plate 44 positioned approximately 5 to 6 inches from the nozzle 42. The high speed collision of the DAF skimmings 11 upon the spatter surface 45 causes the SPN animal components AC within the DAF skimmings to fragment, pulverized, or break apart into smaller pieces or particles SP or denature the molecules. The high speed impact also causes a portion of the water W associated with the SPN animal components AC or smaller pieces SP to be shed or separate from the SPN animal components or smaller pieces as droplets within a mist, as best shown in FIG. 2.

Figure 3A:
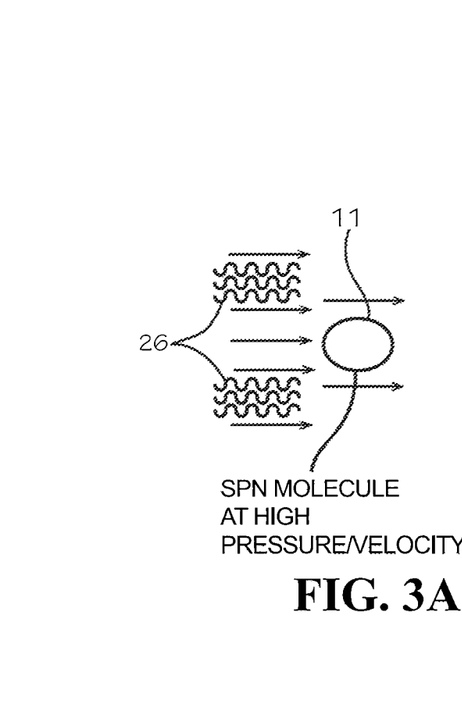
FIGS. 3A, 3B, and 3C illustrate pressurized ejection of DAF skimmings for breaking down the SPN and allowing evaporation of moisture.
Figure 3B:
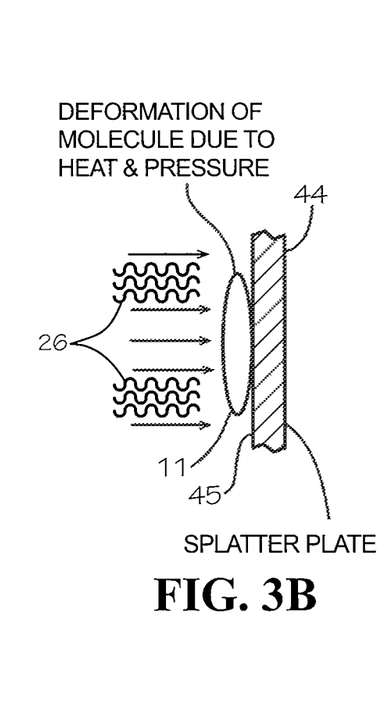
Figure 3C:
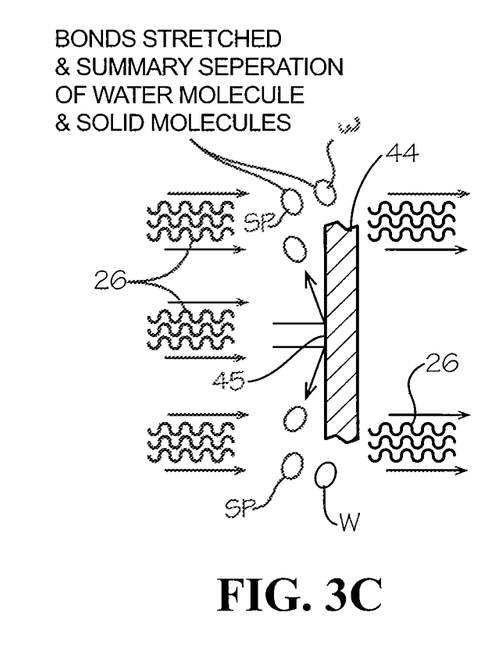

FIGS. 3A, 3B, and 3C illustrate pressurized ejection of DAF skimmings for breaking down the SPN and allowing evaporation of moisture. The pressurized DAF skimmings 11 including the SPN solids and molecules are carried from the nozzle 42 at high pressure and velocity within the air stream 26, as depicted in FIG. 3A. The SPN ejected from the pressure nozzle 42 impacts upon the spatter surface 44 (FIG. 3B) of the splatter plate 45 with sufficient force to deform the normal molecular shape to a thin abnormal condition. This breaks down the normal molecular protective shell and allows the heated air stream 26 to evaporate at least a portion of the molecular encapsulated moisture. As shown in FIG. 3C, the bonds of the SPN and moisture stretch and there is summary separation of the water W as mist and solids molecules as SP that, entrained in the air stream 26, are carried through the dryer chamber 20 for evaporation of the water and the moisture carried by the SPN solids. The splatter plates illustrated in FIGS. 3A, 3B, and 3C preferably are oriented at the angle a, as discussed above.

The now smaller pieces SP of the SPN animal components and the water W droplets are thereby immediately entrained into the airstream 26 that enters the processor chamber 20 through the air inlet 25 and passes about and past the spatter plate 44 in the space between the spatter plate and the interior of the processor chamber 20. The airstream 26 now including the SPN animal component smaller pieces SP then passes through the remaining portion of the processor chamber 20 wherein the beater blades further separate the SPN animal components smaller pieces SP from the water W due to physical impact. This action results in a portion of the animal component smaller pieces SP falling to the bottom of the processor chamber 20 where they are discharged from the processor chamber 20 through the solids outlet 35.

Simultaneously, the water droplets W entrained as mist initially in the air stream 26 begin to evaporate in the heat of the airstream. Any residual water retained by the entrained smaller pieces SP likewise evaporate from the smaller pieces SP, thereby drying the smaller pieces SP and reducing the moisture content of the material within the airstream exiting the processor chamber 20 through the air outlet 29. A portion of the smaller pieces SP may remain entrained within the airstream 26 and exit the processor chamber 20 through the air outlet 29. This apparatus and method according to the invention provides a system that prevents slurry and emulsions that are a common problem with AST dryers and evaporators attempting to process DAF skimmings.

Once through the solids outlet 35, the animal component smaller pieces SP, generally heavier than the air entrained SP, pass to the solids collection bin 36. The smaller pieces SP discharged to the solids collection bin 36 have a moisture content less than that of the influent due to the splattering, heating, and agitation drying process within the airstream 26 of the processing chamber 20. The reduced moisture content of the smaller pieces SP reduces the volume and mass of the drier smaller pieces SP for transport to a reducing facility, thus reducing handling and processing costs and increasing the residual time such smaller pieces SP may be held pending transport before product deterioration and the smaller pieces SP become rancid. The animal component smaller pieces SP are then moved from the collection bin 36 to the centrifuge fats separator 37 wherein the animal fats are separated from the animal solids. The separated animal fats are transferred from the fats separator 37 to a fat catch tank 38. The animal fats are then transferred by pump 57 and delivery pipe 56 to the fat holding tank 58 where they may be stored. The separated animal solids are transferred from the fats separator 37 to conveyor 39 which delivers the animal solids to solids holding bin 54. The resulting dried animal solids and separated fats collect into a transport truck tank for transport to a feed mill or blender for processing for use as animal feed additive.

Referring back to the processing within the processor chamber 20, the airstream 26 now containing lighter air-entrained animal component smaller pieces SP exits the processor chamber through the air outlet 29 and into the second duct 31 wherein the airstream enters the cyclone separator 34 through air inlet 33. The airstream 26 within the cyclone separator 34 swirls about therein causing the entrained lighter animal component smaller pieces SP to further dry and gravitationally fall out of the airstream 26 to the bottom of the cyclone separator 34. The accumulated animal component small pieces SP pass through the material outlet 48, through the opened control valve 50, and into the down pipe 51 where they are conveyed to conveyor 39. Thus, the lighter SPN animal component small pieces SP collected within the cyclone separator 34 are joined or merged with the SPN animal component solids upon the conveyor 39 which are deposited from the centrifuge fats separator 37 and eventually deposited into solids holding bin 54.

The airstream 26, now predominantly voided of SPN animal components and moisture, then exits the separator cyclone 34 through air outlet 47 and into third duct 59. The filtration system 60 filters any remaining animal components while the exhaust fan 61 increases the airflow velocity so that the airstream 26 returns to the air inlet 14 of the heating chamber 13 through the remaining portions of the third duct 59. Thus, the airstream 26 is essentially self-contained and recycled within the DAF skimmings separation system 10. Any over pressurization of the airstream may be dealt with through a release of air pressure through equalizing valve 62.

Once the DAF skimmings 11 is passed through the DAF skimmings separation system 10, the water or moisture content within the SPN is approximately 50 to 60%. Thus, the water content of the DAF skimmings 11 is reduced from an initial moisture content of approximately 85 to 90% to a processed moisture content of approximately 50 to 60%, a significant reduction in the water weight of the SPN and resulting in product ready to blend.

It should be understood that the term spatter plate used herein is not intended to be limited to plates or plate-like structures, as the spatter plate may be in the form of a block, wall, or other similar structure.

Figure 1:
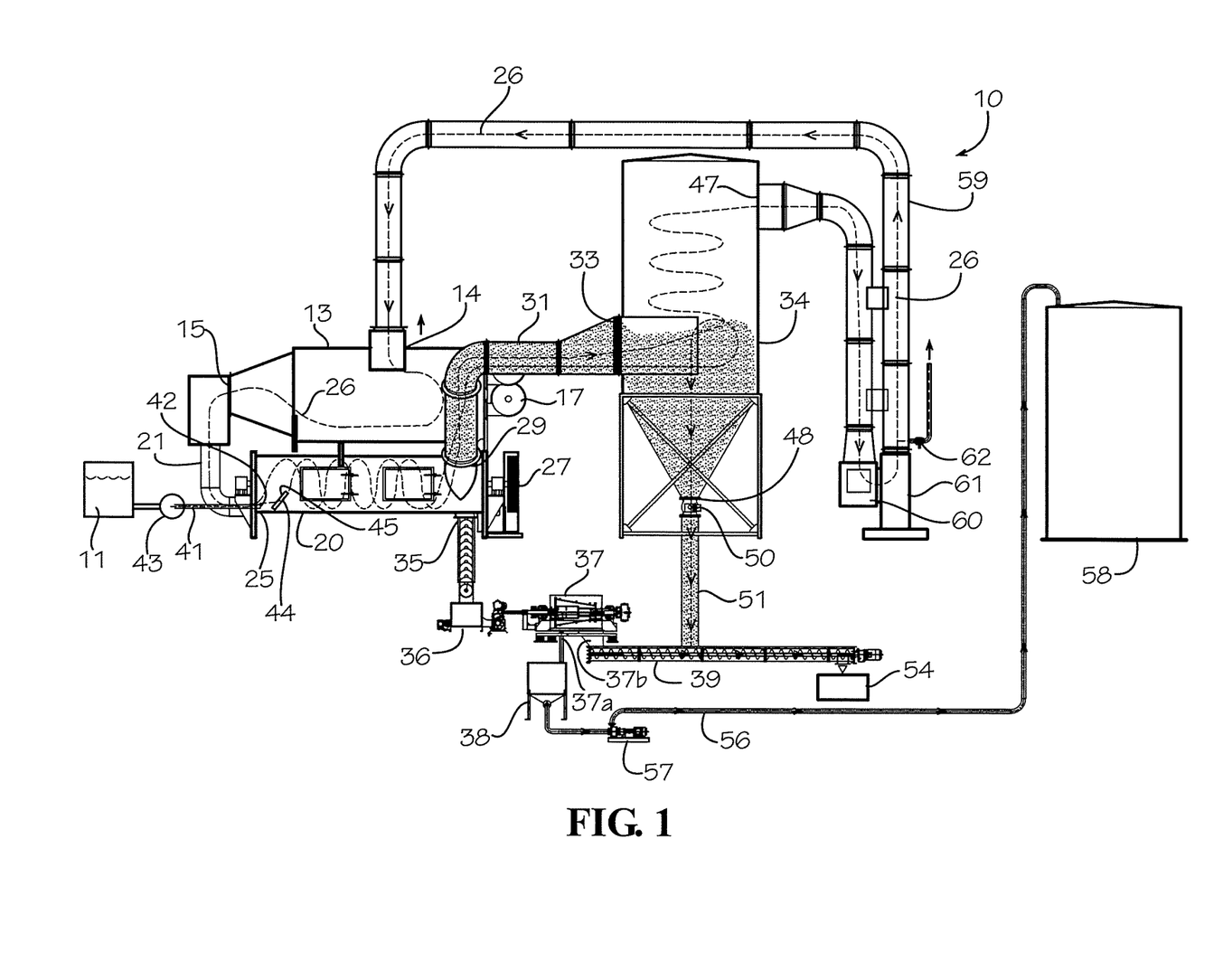
FIG. 1 illustrates in schematic view the DAF skimmings separation apparatus in accordance with the present invention.
Figure 4:
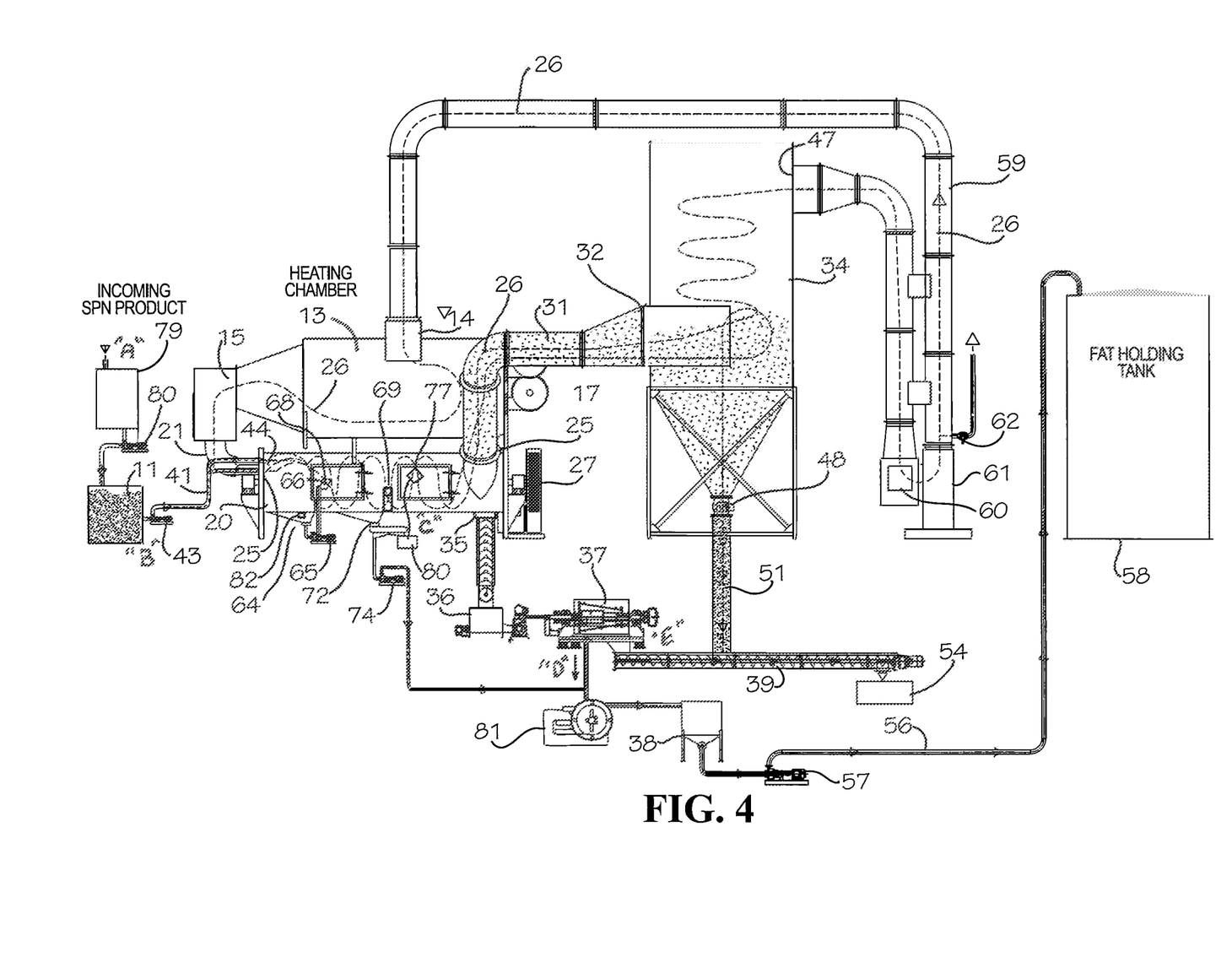
Figure 5:
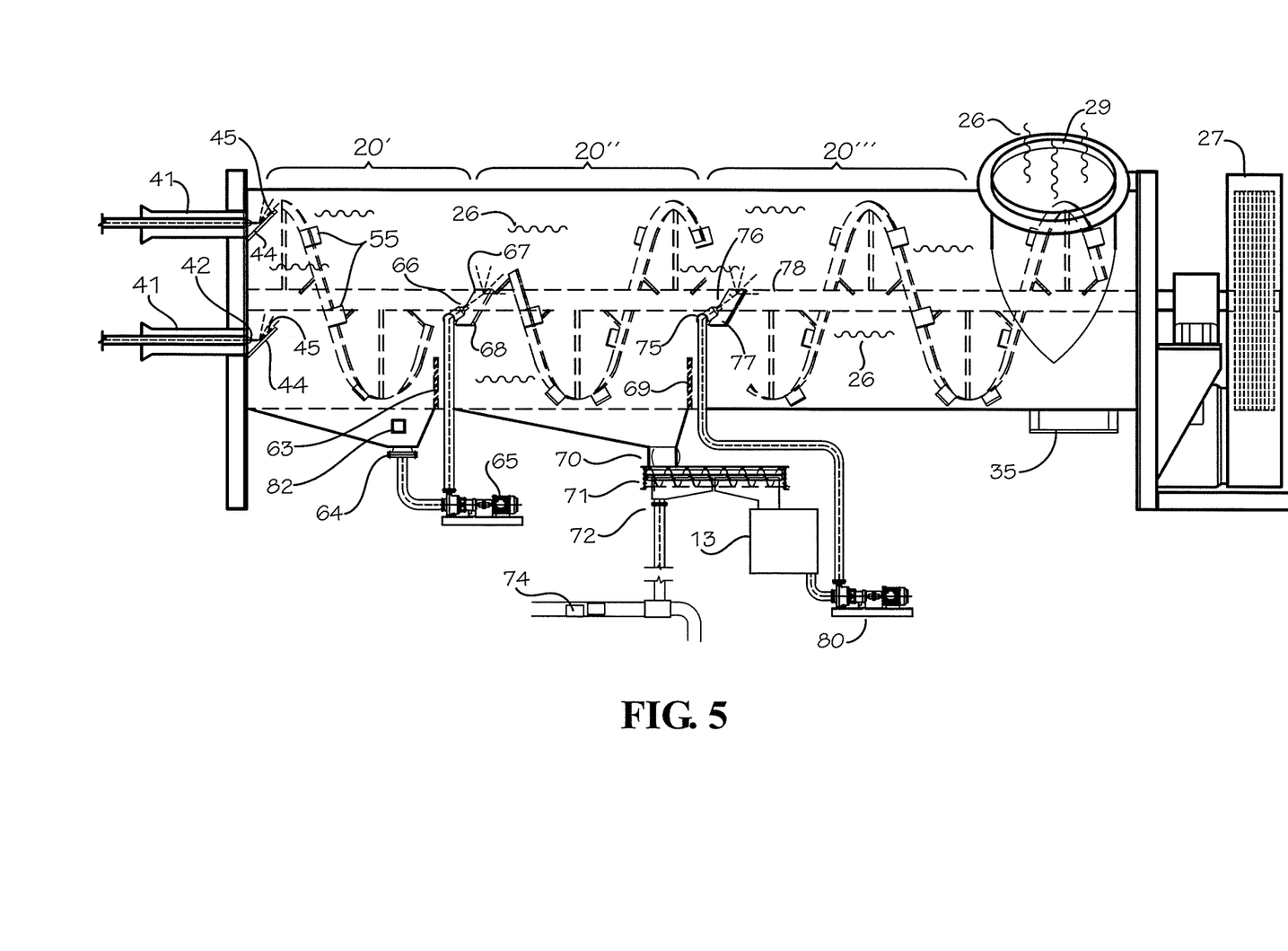

With reference next to FIGS. 4, 5 and 6A, 6B and 6C, there is shown in schematic view a DAF skimmings separation system 10 in accordance with the present invention in a second embodiment of the invention. The reference numerals shown in the drawings of FIGS. 4-6 are consistent with the previous embodiment illustrated in FIGS. 1-3. In this second embodiment, the processor chamber 20 subdivides into a plurality of stages 20', 20", and 20''' for repeated splatter separation effect on the DAF skimmings and the resulting separated water W and SPN SP carried in the air stream 26. The second embodiment gainfully processes a higher volume of DAF skimmings than does the first embodiment. Each stage 20', 20", and 20''' includes a respective high pressure nozzle for directing DAF skimmings and separated water and SPN against a respective splatter plate. The DAF skimmings separation system 10 processes DAF skimmings 11 received from a meat facility processing grinder 79 having a pump 80 so as to separate water and SPN-content solids as disclosed herein. The water decants into a drain for water treatment and clarifying prior to being discharged to a sanitary sewer system. The SPN-content solids discharge is transported to rendering plants for conventional processing to extract the SPN for use in other products.

The DAF skimmings separation system 10 includes a heating chamber 13 having an air inlet 14 and an air outlet 15. The heating chamber 13 may have a gas fired burner which is direct or indirectly fired to provide an efficient heat source. The heating chamber 13 may include one or more blowers 17 and unshown, internal burners which heats an airstream passing there through to a temperature of approximately 400 to 550 degrees Fahrenheit.

The heated air from the heating chamber 13 passes into a processor or processor chamber 20 through a first duct 21 connected at one end to the heating chamber air outlet 15 and an opposite end connected to an air inlet 25 of the processor chamber 20, as indicated by the directional airflow or airstream 26 shown in phantom lines in the drawings.

As noted above, the processor 20 of this second embodiment is different from that of the first embodiment by including a plurality of partially divided in-line chambers or processing stages, as described in more detail hereinafter. The illustrated embodiment provides the processor chamber 20 with three partially divided in-line chambers 20', 20" and 20''' for initial and two subsequent processing effect on the DAF skimmings and subsequent separated SPN solids. The processor chamber 20 includes internal, rotary driven beater blades 55 which induce a mixing motion to the airstream 26 as the airstream passes through the processor chamber 20. The beater blades are driven by a shaft coupled to an electric motor 27 via belts and sheaves for mechanical rotation of the shaft and beater blades. The processor chamber 20 also has an air outlet 29 coupled to a second duct 31 which conveys the airstream 26 to the air inlet 33 of a separator chamber, vessel, or separator cyclone 34. Lastly, the processor chamber 20 has three solid outlets 64, 72, and 35. Outlet 64 defines the introduction to phase II or second stage that provides extra moisture separation (second effect moisture and SPN separation). The SPN 11 feeds from Phase I SPN/moisture separation in chamber 20' to a Phase II spray feed nozzle 66 via high pressure pump 65. The spray nozzle 66 sprays the SPN 11 against a splatter surface of a second splatter plate 68. The pump 65 is controlled by a level indicator 82. After the SPN product has completed Phase II separation effect, the fat-concentrated SPN product transfers through an Air Loc Valve 70 to a drainer 71 of the solids outlet 72. The separated fat from the drainer 71 goes to a pump 74. The separated fat then transfers from the pump 74 to a vertical polisher 81. The separated SPN solids go from the drainer 71 to a heated collection tank 83. The collected SPN solids in the heated collection tank 83 are pumped through a Phase III nozzle 75 into the third stage chamber 20''' against a third splatter plate 75 for subsequent and further separation of moisture and SPN, and subsequent discharge out of the process chamber 20 via the discharge 35 to the heated solids collection tank 36 and the centrifuge 37. The fats separator 37 has a fats outlet connected to a fat catch tank 38 and a solids outlet connected or positioned for material acceptance to a conveyor 39. A delivery pipe 56 and pump 57 connects the fat catch tank 38 to a larger fat holding tank 58.

The processor 20 includes a product feed or material input conduit or line 41 having a terminal end with three introductory pressure or discharge nozzles 42 in the first stage 20' closely adjacent the air inlet 25 of the processor 20. The material input line 41 includes a pressure pump 43 which pressurizes the slurry to approximately 300 p.s.i., however, it should be understood that a preferable range of pressures may be between 100 to 600 p.s.i. depending upon select product and system parameters. The discharge nozzles 42 may be between ¼ inch to one inch in diameter.

The discharge nozzles 42 are oriented to direct the pressurized stream of slurry expelled from the discharge nozzles 42 onto an adjacent respective spatter plate 44 associated with each nozzle 42 positioned adjacent the entry end of processor 20 and spaced away from the interior of the processor 20 to create a space 46 at least partially about each spatter plate. The discharge nozzles 42 are positioned approximately 5 to 6 inches from the associated spatter surface 45. The spatter plates 44 have a spatter surface 45 oriented at an oblique angle relative to the direction of the DAF skimmings stream expelled from the associated nozzle 42, and preferably at an angle of approximately 30 to 45 degrees with respect to the direction of the DAF skimmings stream, shown in FIG. 2 as angle a. The spatter surfaces 45 are approximately 4 to 12 inches in diameter and are made of a hardened material such as an abrasion resistant steel plate or comparable material to prevent erosion upon the spatter surfaces 45. The illustrated embodiment depicts a plurality of the nozzles 42 and associated splatter plates 44.

Figure 6A:
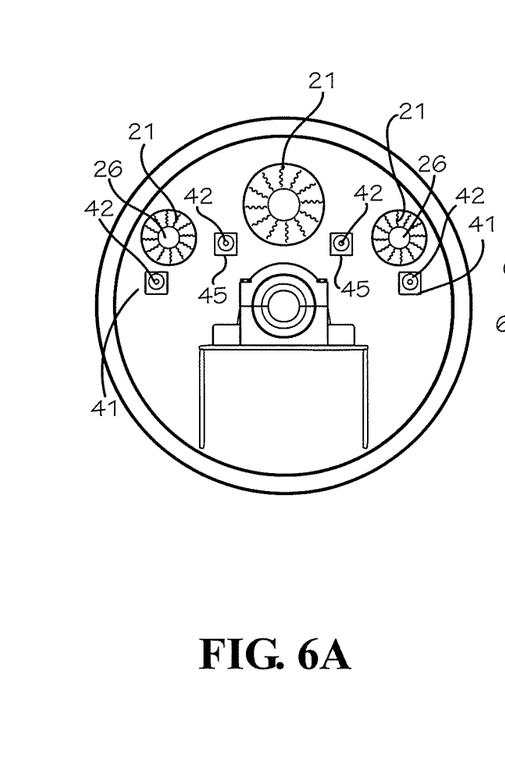
Figure 6B:
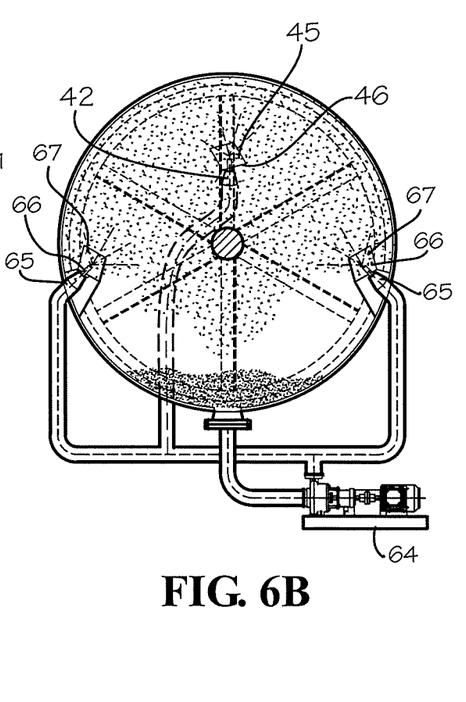
Figure 6C:
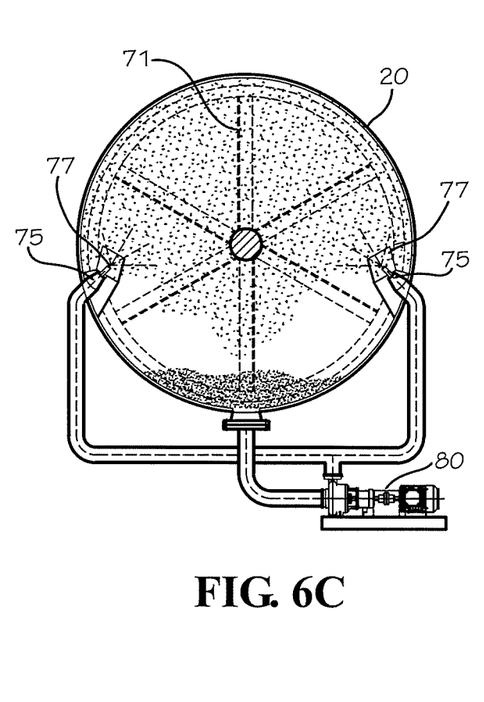

Here, and as best shown in FIG. 5, the processor 20 includes the first chamber or first stage 20' partially defined by a short separating wall 63 which commences the second chamber or second stage 20". The second stage 20" is partially defined by a second short separating wall 69 which commences the third chamber or third stage 20'". The first stage 20' houses the nozzles 42 and spatter plates 44. As illustrated in FIG. 6A, the nozzles 42 are disposed in an upper portion of the chamber stage 20' for expelling into the airstream 26 and splattering on the splatter plates 44. The floor of the first stage 20' is slanted to form a sump having an outlet therein coupled to a collection conduit 64 which in turn is coupled to a supplemental pump 65 which re-pressurizes the SPN 11 collected within the first stage 20' and forces it through collection conduit to the subsequent or supplemental second discharge nozzle 66 into the second chamber stage 20".

In the second chamber stage 20", the SPN 11 expels from the supplemental discharge nozzle 66 onto an adjacent spatter plate 67 to cause the SPN to be further broken down, separated, or fragmented within the second stage 20", and thus having a second further processing effect on the SPN separated from the DAF skimmings. As shown in FIG. 6B, the nozzles 66 are disposed intermediate an upper and lower extents of the chamber 20" and preferably substantially medial the extents and angled upwardly for impacting splattering of the SPN on the splatter plates 67. The illustrated embodiment disposes a pair of nozzles 66 on opposing sides of the chamber 20", although alternatively an embodiment (not illustrated) may use a single nozzle/splatter plate disposed within an appropriate portion of the airstream 26 relative to the beater blades therein.

The second stage 20" also includes a floor having a sump having an outlet therein coupled to a second collection conduit which in turn is coupled to the drainer 71 having a screw or auger. The auger further separates fat from solid particles, wherein the fat is conveyed through discharge conduit 72 by the force of a second supplemental pump 74. The solids are sent to a holding bin 73 where they are then forced by pump 80 through a conduit to a second subsequent or supplemental discharge or pressure nozzle 75 located within the third stage 20'". The SPN 11 being expelled through supplemental discharge nozzle 75 impacts upon an associated spatter surface 76 of spatter plate 77 to cause the SPN to be even further broken down, separated, or fragmented within the third stage 20'". As illustrated in cross-sectional end view in FIG. 6C, the nozzles 75 are disposed intermediate an upper and lower extents of the chamber 20'" and preferably substantially medial the extents and angled upwardly for impacting splattering of the SPN on the splatter plates 77. The illustrated embodiment disposes a pair of nozzles 75 on opposing sides of the chamber 20'", although alternatively an embodiment (not illustrated) may use a single nozzle/splatter plate disposed within an appropriate portion of the airstream 26 relative to the beater blades therein.

The separator 34 has an air outlet 47 located adjacent the top end of the separator and a solids or material outlet 48 located at the bottom end of the separator. In at least one embodiment a material outlet 48 may be coupled to a control or feeder valve 50 which in turn is coupled to a down pipe 51. The down pipe 51 may convey the solid material to the solids conveyor 39, or other type of delivery system, which terminates at a solids holding bin 54.

The air outlet 47 of the separator 34 is connected to a first end of a third duct 59 having an opposite, second end connected to the air inlet 14 of the heating chamber 13. The third duct 59 may include an air filtration system 60 and an exhaust fan 61 to provide or supplement the airstream 26 through the system 10. The third duct 59 may include an airstream equalizing valve 62 which may vent a portion of the airstream 26 to ambience to prevent over pressurization of the system.

The basic design of the heating chamber 13, processor chamber 20, separator 34, and other components are conventional and well known in the art. These portions or components are shown in U.S. Pat. No. 9,174,220 B2 which is specifically incorporated herein by reference in its entirety.

In use, the initial DAF skimmings 11, comprised of approximately 85 to 90% by weight of water with the remaining portion consisting of SPN animal components, such as fat, blood, bodily fluids, bone fragments, etc., is pressurized to approximately 300 p.s.i. by pressure pump 43. The pressurized DAF skimmings 11 is then conveyed through material input line 41 and expelled from nozzles 42 as a forceful stream of DAF skimmings having a pressure of approximately 300 p.s.i. and a velocity of approximately 1.2 cfm or 9 gpm, as shown in FIG. 2.

The expelled stream of DAF skimmings 11 is in-line with the spatter plate 44 so that the DAF skimmings stream impacts, splatters, or spatters upon the spatter surface 45 of the spatter plate 44 positioned approximately 5 to 6 inches from the nozzle 42. The high speed collision of the DAF skimmings 11 upon the spatter surface 45 causes the animal components AC within the DAF skimmings to fragment, pulverized, or break apart into smaller pieces or particles SP. The high speed impact also causes a portion of the water W associated with the animal components AC or smaller pieces SP to be shed or separate from the animal components or smaller pieces as droplets within a mist, as best shown in FIG. 2.

The now smaller pieces SP of the animal components and the water W droplets are immediately entrained into the airstream 26 within the processor chamber 20, which airstream enters through air inlet 25 and passes about and past the spatter plate 44 in the space between the spatter plate and the interior of the processor chamber 20. The airstream 26 now including the animal component smaller pieces SP then passes through the remaining portion of the processor chamber 20 wherein the beater blades further separate the animal components smaller pieces SP from the water W due to physical impact.

In the second embodiment shown in FIGS. 4 and 5, this action in the first stage 20' results in the airstream 26 carrying a portion of the entrained SPN in to the second stage 20" while a portion of the separated SPN falls to the sump of the slanted floor blocked by the separating wall 63. The SPN in the sump flows to the outlet and collection conduit 64 to the supplemental pump 65. The pump 65 re-pressurizes the SPN 11 collected within the first stage 20' and forces the collected SPN to the subsequent or supplemental second discharge nozzle 66. The SPN 11 expels under pressure from the supplemental discharge nozzle 66 onto the adjacent spatter plate 67. This causes the collected SPN to be further broken down, separated, or fragmented within the second stage 20″, and thus having a second further processing effect on the SPN separated from the DAF skimmings.

Portions of the further fragmented SPN entrains in the airstream 26 in the second stage 20″ while a portion of the fragmented SPN falls and collects on the sump floor to flow to the outlet valve 70 to the drainer 71. The auger in the drainer 71 rotates to carry the SPN to discharge. The auger further separates fat from solid particles, wherein the fat is conveyed through the discharge conduit 72 by the second supplemental pump 74 for communicating to a vertical polisher. However, the separated SPN solids discharge to the holding bin 73. This bin may be heated to facilitate flow of the SPN solids. The SPN solids in the holding tank 73 are forced by the pump 80 through to the second subsequent or supplemental discharge or pressure nozzle 75 located within the third stage 20‴. The SPN 11 expels through supplemental discharge nozzle 75 and impacts upon the associated spatter surface 76 of spatter plate 77. This causes the SPN to be even further broken down, separated, or fragmented within the third stage 20‴.

It is to be appreciated that further subsequent processing stages may gainfully be provided along the length of the processing chamber 20 with respective drainers, collection bins, and pressurizing pumps for expelling the further treated SPN against a splatter plate of the subsequent stage.

Returning to the illustrated embodiment in FIG. 5, the SPN in the third stage 20‴ further breaks down, separates, and fragments to become entrained in the airstream 26. As airstream flows through remaining portion of the processing chamber 20, the animal component smaller pieces SP fall to the bottom of the processor chamber 20 where they are discharged from the processor chamber 20 through the solids outlet 35.

Simultaneously, the water droplets W entrained as mist in the air stream 26 continue to evaporate in the heat of the airstream in the stages 20″ and 20‴. Residual water retained by the entrained smaller pieces SP likewise evaporate from the smaller pieces SP, thereby drying the smaller pieces SP and reducing the moisture content of the material within the airstream exiting the processor chamber 20 through the air outlet 29. A portion of the smaller pieces SP may remain entrained within the airstream 26 and exit the processor chamber 20 through the air outlet 29.

Once through the solids outlet 35, the animal component smaller pieces SP, generally heavier than the air entrained SP, pass to the solids collection bin 36. The smaller pieces SP discharged to the solids collection bin 36 have a moisture content less than that of the influent due to the splattering, heating, and agitation drying process within the airstream 26 of the processing chamber 20. The reduced moisture content of the smaller pieces SP reduces the volume and mass of the drier smaller pieces SP for transport to a reducing facility, thus reducing handling and processing costs and increasing the residual time such smaller pieces SP may be held pending transport before product deterioration and the smaller pieces SP become rancid. The animal component smaller pieces SP are then moved from the collection bin 36 to the centrifuge fats separator 37 wherein the animal fats are separated from the animal solids. The separated animal fats are transferred from the fats separator 37 to a fat catch tank 38. The separated animal fats from the pump 74 and conduit are also conveyed to a conduit between the fats separator 37 and gat catch tank 38. The vertical polisher 81 may also be included to aid the process. The animal fats are then transferred by pump 57 and delivery pipe 56 to the fat holding tank 58 where they may be stored. The separated animal solids are transferred from the fats separator 37 to conveyor 39 which delivers the animal solids to solids holding bin 54. The resulting dried animal solids and separated fats collect into a transport truck tank for transport to a rendering plate for processing for use as animal feed additive.

Referring back to the processing within the processor chamber 20, the airstream 26 now containing lighter air-entrained animal component smaller pieces SP exits the processor chamber through the air outlet 29 and into the second duct 31 wherein the airstream enters the cyclone separator 34 through air inlet 33. The airstream 26 within the cyclone separator 34 swirls about therein causing the entrained lighter animal component smaller pieces SP to further dry and gravitationally fall out of the airstream 26 to the bottom of the cyclone separator 34. The accumulated animal component small pieces SP pass through the material outlet 48, through the opened control valve 50, and into the down pipe 51 where they are conveyed to conveyor 39. Thus, the lighter animal component small pieces SP collected within the cyclone separator 34 are joined or merged with the animal component solids upon the conveyor 39 which are deposited from the centrifuge fats separator 37 and eventually deposited into solids holding bin 54.

The airstream 26 which is now predominantly voided of animal components and moisture then exits the cyclone separator 34 through air outlet 47 and into third duct 59. The filtration system 60 filters any remaining animal components while the exhaust fan 61 increases the airflow velocity so that the airstream 26 returns to the air inlet 14 of the heating chamber 13 through the remaining portions of the third duct 59. Thus, the airstream 26 is essentially self-contained and recycled within the DAF skimmings separation system 10. Any over pressurization of the airstream may be dealt with through a release of air pressure through equalizing valve 62.

Once the DAF skimmings 11 is passed through the DAF skimmings separation system 10, the water or moisture content within the DAF skimmings is approximately 50 to 60%. Thus, the water content of the DAF skimmings 11 is reduced from an initial moisture content of approximately 85 to 90% to a processed moisture content of approximately 50 to 60%, a significant reduction in the water weight of the DAF skimmings resulting in a decreased cost of transporting such.

It should be understood that the term spatter plate used herein is not intended to be limited to plates or plate-like structures, as the spatter plate may be in the form of a block, wall, or other similar structure.

The de-watering achieved by the disclosed apparatus and method was evaluated with samples extracted from the apparatus at selected steps during processing as indicated by code samples A, B, C, D, and E shown in FIG. 4. Table 1 indicates the evaluation sample (which code corresponds to the references A, B, C, D and E shown in FIG. 4) and a description.

TABLE 1

Samples Extracted From Apparatus During Processing

| Evaluation Sample | Description |
|---|---|
| A | Raw DAF from processing plant (prior to de-watering actions with an apparatus according to the present invention) |

TABLE 1-continued

Samples Extracted From Apparatus During Processing

| Evaluation Sample | Description |
|---|---|
| B | After separation of sludge using apparatus and method disclosed in U.S. Pat. No. 8,163,176 for cracking the DAF skimmings |
| C | After separation/dewatering with sample of separated solids in solids outlet 35 |
| D | Sample of fats collected in fats catch basin 38 |
| E | Sample of separated solids deposited on conveyer 39 |

Table 2 below reports the analyzed samples listed in Table 1, as to percent moisture, percent fat content, percent solids, percent ash, and percent protein. Further, Table 2 reports the percent content of the solids portion of the sample.

TABLE 2

Analysis of Evaluation Samples

| Evaluation | Sample at A | Sample at B | Sample at C | Sample at D | Sample at E |
|---|---|---|---|---|---|
| % Moisture | 77.78 | 70.00 | 45.45 | 1.23 | 67.96 |
| % Fat | 9.74 | 18.45 | 34.45 | 0.00 | 7.80 |
| % Solids | 12.48 | 11.55 | 20.10 | 98.77 | 24.24 |
| % Ash | 0.62 | 0.92 | 1.39 | 0.00 | 1.54 |
| % Protein | 4.35 | 5.88 | 9.63 | 0.00 | 11.57 |
| FFA (percent) | 7.67 | 6.73 | 12.05 | 11.92 | 11.20 |
| FAC (color) | 11A− | 31+ | 45+ | 45+ | 45 + 0 |
| Dry Protein (percent) | 34.83 | 50.89 | 47.92 | | 47.75 |
| Dry Fat (percent) | 43.82 | 61.49 | 63.19 | | 24.36 |
| Dry Ash (percent) | 4.96 | 7.93 | 6.94 | | 6.37 |
| Impurities (percent) | | | | 0.18 | |

The foregoing test results demonstrate the performance of the present separation and dewatering apparatus that recovers valuable by-product nutrients while minimizing waste residuals for disposal and facilitates returning clarified water to sanitary water supply systems for processing and discharge. Further, the intermediate samples confirm the separating and dewatering treatment at each interval in the process. It is to be appreciated that process controls may utilize such samples testing during processing for adjustments internally in the process to improve the resulting processed nutrients, the separated residuals, and returned clarified water, and thus improve the final results from the apparatus.

The results of Sample A provide the input parameters of the incoming flow of SPN 11 received from the meat facility processing discharged to the separation and dewatering apparatus. The results of Sample B allow monitoring and adjusting of operations based on the input parameters of the decanted SPN-content solids discharge from an initial separation tank. The results of Samples C, D and E confirm the performance of the apparatus and may provide additional information for continued treatment that may be required.

The test results of Sample A reported in Table 2 provide the analysis of the input product to be separated into three distinct separate products (nutritional fat, residual solids and clarified water).

The test results as to Sample B indicate the analysis of the decanted water and solids (fats and residual solids) resulting from the initial separation tank using an apparatus and method disclosed in U.S. Pat. No. 8,163,176 for cracking the Sample A DAF skimmings.

The test results as to Samples C, D and E represent analysis from respective locations noted on FIG. 4. Sample C indicates a process location in an initial stage of dewatering treatment and particularly, the removal of fats from the influent by the processing apparatus.

Sample D indicates a subsequent intermediate location shown in FIG. 4, at a location removal of heavy solids mixed with remaining fats. The test results provide an indication as to the performance of the processing apparatus in connection with the heavy solids/fats mixture. This analysis may provide input data for operation of the solids/fats separation portion of the process.

Sample E provides the results of the discharge of the solids portion of the solids/fats separation equipment.

The test data reflects the surprising separation and dewatering performance achieved by an embodiment of the present disclosed apparatus and process. The apparatus and process separate the DAF skimmings into three distinctive and usable finished products: fats, solids and recoverable water. The test analysis reported in Table 2 indicates that the majority of the water is removed. This is initially shown by a comparison of the volume reduction of moisture content from Sample A to Sample B, and then in the resulting Sample C fats, Sample D solids, and Sample E discharge. The analysis indicates this fact by comparing the Fat %, Ash %, Protein %, Dry Protein content, Dry Fat content and Dry Ash content as to the samples A and B, which all indicate an increase in percentages without an increase in percent moisture content; in fact, the moisture content dropped by several percent from about 78 percent to about 70 percent between the samples A and B.

However, the feature of the present apparatus is the further reduction of moisture content. The test results in Table 2 indicate an increased effective dewatering by the processing apparatus shown by the Samples C, D and E when the finished product is removed from the processing apparatus. For example; the Fat % increased from A to B to C until the processed fat was removed between the Sample C and Sample D.

Further, the % Ash and % Protein analysis both indicate that the ash and proteins were not removed with the fats but continued to be processed within the system.

The analysis for Sample E indicate that the Fat % remained in the product removed in Sample C and the Protein %, Solids % and Ash % constitute the majority of the total Sample E with a small fraction of residual fat. This demonstrates the surprising effectiveness of the apparatus and process not accomplished with other DAF skimming, separation and dewatering processes. The residual moisture in Sample E is easily flashed out of the finished product, because the moisture is free moisture and no longer bound as compounds (i.e., in the finished fats and solids residual within the finished product.) For comparison, the majority of the moisture in the initial product indicated by Sample A is bound moisture in emulsions and is not free moisture as found in the finished product.

The FFA percentage provides an indication of the quality of the resulting product (less rancid being commercially more valuable and material stable).

The comparison shows that the present apparatus and method effectively and efficiently separate the DAF skimmings into three usable products of fats, solids, and clarified water from a solution of the three products that are otherwise unusable directly as animal feed or dischargeable to water sanitary systems (without first being separated), and land fill disposal without treatment of such DAF skimmings no longer necessary.

The foregoing discloses the DAF skimmings separation and dewatering apparatus and method resulting in usable products of separated nutritionally valuable fats, residual solids and clarified water that may be discharged directly or with minimal additional treatment into a sanitary water system. The principles, preferred embodiments, and modes of operation of the present invention have been described in the foregoing specification with regard to illustrative, non-limiting embodiments. The invention accordingly is not to be construed as limited to the particular forms disclosed as these are regarded as illustrative rather than restrictive. Moreover, variations and changes may be made by those skilled in the art without departing from the spirit of the invention described in the following claims and which equivalents are intended to be encompassed thereby.

What is claimed is:

1. A DAF skimmings separator system for separating SPN animal component solids from water within a supply of DAF skimmings, comprising:
    an exhaust fan for creating an airstream;
    a heating chamber having a heat source to heat the airstream;
    a processor chamber in fluid communication with said heating chamber, said processor chamber having an animal component solids outlet and an airstream outlet;
    a liquid pressurizing pump coupled to a DAF skimmings input conduit terminating at an introductory pressure nozzle positioned within said processor chamber, said liquid pressuring pump being adapted to pressurize a supply of DAF skimmings expelled through said introductory pressure nozzle;
    a spatter surface positioned within said processor chamber adjacent to and aligned with said introductory pressure nozzle so that the pressurized DAF skimmings ejected from said introductory pressure nozzle impacts upon said spatter surface with sufficient force to cause animal components within the DAF skimmings to break into smaller pieces;
    a first animal component solids collector in fluid communication with said processor chamber animal component solids outlet;
    a separator in fluid communication with said processor chamber airstream outlet to separate animal component solids from the airstream passing through said separator, said separator having an air outlet and an animal component material outlet, and
    a second animal component solids collector in fluid communication with said animal components material outlet.

2. The DAF skimmings separator system of claim 1 wherein said spatter surface includes a spatter plate positioned within said processor chamber.

3. The DAF skimmings separator system of claim 2 wherein said spatter plate is positioned at an oblique angle to the direction of the DAF skimmings expelled from said introductory pressure nozzle.

4. The DAF skimmings separator system of claim 1 wherein said introductory pressure nozzle comprises a plurality of introductory pressure nozzles.

5. The DAF skimmings separator system of claim 2 wherein said liquid pressuring pump and said introductory pressure nozzle are configured to expel the DAF skimmings from said introductory pressure nozzle at a pressure of 100 to 600 p.s.i.

6. The DAF skimmings separator system of claim 2 wherein said liquid pressuring pump and said introductory pressure nozzle are configured to expel the DAF skimmings from said introductory pressure nozzle at a pressure of approximately 300 p.s.i. at about 9 gpm.

7. The DAF skimmings separator system of claim 1 wherein a space exists between said spatter plate and the interior of said process chamber wherein the airstream passing through said process chamber travels at least partially about said spatter surface to entrain animal components contacting said spatter surface into said airstream passing about said spatter surface and through said space.

8. The DAF skimmings separator of claim 1 wherein said processor chamber includes a first sump, a first collection conduit in fluid communication with said first sump, a first supplemental pump, a first supplemental nozzle, and a first supplemental spatter surface positioned adjacent to said first supplemental nozzle, whereby DAF skimmings collected in the first sump is pressurized by the first supplemental pump and conveyed through the first collection conduit to the first supplemental nozzle where it is ejected onto the first supplemental spatter surface.

9. The DAF skimmings separator of claim 8 wherein said processor chamber includes a second sump, a second collection conduit in fluid communication with said second sump, a second supplemental pump, a second supplemental nozzle, and a second supplemental spatter surface positioned adjacent to said second supplemental nozzle, whereby DAF skimmings collected in the second sump is pressurized by the second supplemental pump and conveyed through the second collection conduit to the second supplemental nozzle where it is ejected onto the second supplemental spatter surface.

10. A DAF skimmings separator system for separating animal component solids from water within a supply of DAF skimmings, the DAF skimmings separator system comprising:
    a heated airflow creating system including a heater, an exhaust fan, and a processor chamber for separating animal component solids from an airstream carrying the animal component solids;
    a liquid pressurizing system having an introductory pressure nozzle positioned within said processor chamber for pressuring and ejecting a supply of DAF skimmings containing animal components and water;
    a spatter surface positioned within said processor chamber adjacent said introductory pressure nozzle so that the pressurized DAF skimmings ejected from said introductory pressure nozzle impacts upon said spatter surface with sufficient force to cause animal components within the DAF skimmings to break into smaller pieces, and
    an animal component solids collector in fluid communication with said processor chamber.

11. The DAF skimmings separator system of claim 10 further comprising a separator in fluid communication with said processor chamber which separates animal component solids from the airstream passing from said processor chamber and through said separator.

12. The DAF skimmings separator system of claim 11 wherein said separator includes an air outlet, an animal component material outlet and a second animal component solids collector in fluid communication with said animal components material outlet.

13. The DAF skimmings separator system of claim 10 wherein said spatter surface includes a spatter plate positioned within said processor chamber.

14. The DAF skimmings separator system of claim 13 wherein said spatter plate is positioned at an oblique angle to the direction of the DAF skimmings expelled from said introductory pressure nozzle.

15. The DAF skimmings separator system of claim 10 wherein said introductory pressure nozzle comprises a plurality of introductory pressure nozzles.

16. The DAF skimmings separator system of claim 10 wherein said liquid pressuring system and said introductory pressure nozzle are configured to expel the DAF skimmings from said introductory pressure nozzle at a pressure of 100 to 600 p.s.i. at about 9 gpm.

17. The DAF skimmings separator system of claim 10 wherein said liquid pressuring pump and said introductory pressure nozzle are configured to expel the DAF skimmings from said introductory pressure nozzle at a pressure of approximately 300 p.s.i.

18. The DAF skimmings separator system of claim 10 wherein a space exists between said spatter plate and the interior of said process chamber wherein the airstream passing through said process chamber travels at least partially about said spatter surface to entrain animal components contacting said spatter surface into said airstream passing about said spatter surface and through said space.

19. The DAF skimmings separator of claim 10 wherein said processor chamber includes a first sump, a first collection conduit in fluid communication with said first sump, a first supplemental pump, a first supplemental nozzle, and a first supplemental spatter surface positioned adjacent to said first supplemental nozzle, whereby DAF skimmings collected in the first sump is pressurized by the first supplemental pump and conveyed through the first collection conduit to the first supplemental nozzle where it is ejected onto the first supplemental spatter surface.

20. The DAF skimmings separator of claim 19 wherein said processor chamber includes a second sump, a second collection conduit in fluid communication with said second sump, a second supplemental pump, a second supplemental nozzle, and a second supplemental spatter surface positioned adjacent to said second supplemental nozzle, whereby DAF skimmings collected in the second sump is pressurized by the second supplemental pump and conveyed through the second collection conduit to the second supplemental nozzle where it is ejected onto the second supplemental spatter surface.

21. A method of separating animal component solids from water within a supply of DAF skimmings, the method comprising the steps of:
(a) providing a DAF skimmings separator system having a heated airflow creating system, a processor chamber, a liquid pressurizing system having an introductory pressure nozzle positioned within the processor chamber for pressuring and ejecting a supply of DAF skimmings containing animal components and water, and a spatter surface positioned within the processor chamber adjacent the introductory pressure nozzle;
(b) pressurizing a supply of DAF skimmings containing animal components and water;
(c) ejecting the supply of DAF skimmings through the introductory pressure nozzle so as to impact upon the spatter surface positioned within the processor chamber with a force sufficient to break the animal components within the DAF skimmings into smaller pieces;
(d) entraining a portion of the animal components impacted upon the spatter surface into an airstream created by the heated airflow creating system;
(e) conveying the airstream containing a first portion of the animal components from the processor chamber, and
(f) collecting a second portion of the animal components within the processor chamber which were not entrained into the airstream.

22. The method of claim 21 wherein the airstream containing the first portion of the animal components from the processor chamber are conveyed to a separator which further separates the first portion of the animal components from the airstream.

23. The method of claim 21 wherein the supply of DAF skimmings is ejected from the nozzle at a pressure of 100 to 600 p.s.i.

24. The method of claim 21 wherein the supply of DAF skimmings is ejected from the nozzle at a pressure of approximately 300 p.s.i.

25. The method of claim 21 wherein the supply of DAF skimmings is ejected onto the spatter surface at an oblique angle.

26. The method of claim 21 wherein DAF skimmings is partially collected within the processor chamber, re-pressurized, and ejected through a first supplemental nozzle positioned within the processor chamber onto a first supplemental spatter surface positioned within the processor chamber adjacent said first supplemental nozzle.

27. The method of claim 26 wherein DAF skimmings is partially collected within the processor chamber a second time, re-pressurized a second time, and ejected through a second supplemental nozzle positioned within the processor chamber onto a second supplemental spatter surface positioned within the processor chamber adjacent said second supplemental nozzle.

* * * * *